US009654898B2

(12) United States Patent
Martin

(10) Patent No.: US 9,654,898 B2
(45) Date of Patent: May 16, 2017

(54) MANAGING MEDIA CONTENT, FEDERATED PLAYER

(71) Applicant: Amazon Technologies, Inc., Reno, NV (US)

(72) Inventor: Bobby Dean Martin, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 246 days.

(21) Appl. No.: 14/059,147

(22) Filed: Oct. 21, 2013

(65) Prior Publication Data
US 2015/0113021 A1  Apr. 23, 2015

(51) Int. Cl.
*G06F 17/30* (2006.01)
*H04W 4/00* (2009.01)

(52) U.S. Cl.
CPC ........ *H04W 4/00* (2013.01); *G06F 17/30743* (2013.01)

(58) Field of Classification Search
CPC ......... G06F 17/30864; G06F 17/30867; G06F 17/30067; G06F 17/3001; G06F 17/30017; G06F 17/30053; G06F 17/3064; G06F 17/30424; G06F 17/30761; G06F 17/30312; G06F 17/30321; G06F 17/30327; G06F 17/30395; G06F 17/30743; G06F 17/30752; G06F 17/30; G06Q 30/02; H04L 65/4076; H04L 65/60
USPC ... 707/705, 999.001, 999.006, 999.003, 749; 725/37, 46
See application file for complete search history.

(56) References Cited

U.S. PATENT DOCUMENTS

| 6,545,209 | B1* | 4/2003 | Flannery | G06F 17/30017 707/E17.009 |
| 7,277,766 | B1* | 10/2007 | Khan et al. | G06F 17/30743 380/237 |
| 8,028,038 | B2* | 9/2011 | Weel | 709/219 |
| 2003/0221541 | A1* | 12/2003 | Platt | G06F 17/30038 84/609 |
| 2004/0215447 | A1* | 10/2004 | Sundareson | G10L 19/0208 704/200.1 |
| 2005/0060264 | A1* | 3/2005 | Schrock | G11B 27/105 705/51 |
| 2006/0143236 | A1* | 6/2006 | Wu | 707/104.1 |
| 2006/0265421 | A1* | 11/2006 | Ranasinghe | G06F 17/30743 |

(Continued)

OTHER PUBLICATIONS

PCT/US2014/061391, "International Search Report and Written Opinion", mailed Jan. 21, 2015, 10 pages.

(Continued)

*Primary Examiner* — James Trujillo
*Assistant Examiner* — Aida Tessema
(74) *Attorney, Agent, or Firm* — Kilpatrick Townsend & Stockton LLP

(57) ABSTRACT

Electronic content items may be organized into playlists and associated with a plurality of sources. These playlists may be managed using at least one media content manager. A compatibility hierarchy may be implemented to determine compatibility of certain electronic content items with other electronic content items, which may be organized into playlists. Other playlists may be populated based at least in part on the compatibility hierarchy. Playlists comprising electronic content items associated with a plurality of sources may be playable by implementing a federated media player.

19 Claims, 11 Drawing Sheets

(56) References Cited

U.S. PATENT DOCUMENTS

| | | | |
|---|---|---|---|
| 2007/0048714 A1* | 3/2007 | Plastina | G06F 17/30775 |
| | | | 434/308 |
| 2007/0192368 A1* | 8/2007 | Nichols | G06F 17/30017 |
| 2008/0052371 A1* | 2/2008 | Partovi et al. | 709/217 |
| 2008/0134032 A1 | 6/2008 | Pirnack et al. | |
| 2009/0144273 A1* | 6/2009 | Kappos | G06F 17/30743 |
| 2011/0060742 A1 | 3/2011 | Heller et al. | |
| 2012/0207448 A1* | 8/2012 | Hama | H04N 5/76 |
| | | | 386/241 |
| 2012/0290916 A1* | 11/2012 | Parekh | G06F 17/30058 |
| | | | 715/234 |
| 2013/0021348 A1 | 1/2013 | Corazza et al. | |
| 2013/0073584 A1 | 3/2013 | Kuper et al. | |
| 2014/0258292 A1* | 9/2014 | Thramann et al. | 707/736 |

OTHER PUBLICATIONS

U.S. Appl. No. 14/059,301, filed Oct. 21, 2013, Titled: Managing Media Content, Playlist Sharing.

* cited by examiner

MANAGING MEDIA CONTENT, FEDERATED PLAYER

CROSS REFERENCE TO RELATED APPLICATIONS

This application is related to application Ser. No. 14/059,301, filed on the same day herewith, entitled "MANAGING MEDIA CONTENT, PLAYLIST SHARING," the entire contents of which is hereby incorporated by reference as if fully set forth herein.

BACKGROUND

The arrangement of electronic content items, especially electronic music files, into playlists has become widely available in recent years. Such arrangements may comprise the organization of a user's or listener's personal music based on his or her preferences. For example, a user may create a playlist of different songs by different artists that the user prefers to listen to while exercising. Playlists are typically specific to the device or service used for their creation. Thus, managing electronic content items associated with playlists may pose challenges to users and media content services alike.

BRIEF DESCRIPTION OF THE DRAWINGS

Various embodiments in accordance with the present disclosure will be described with reference to the drawings, in which.

DETAILED DESCRIPTION

Figure 1:
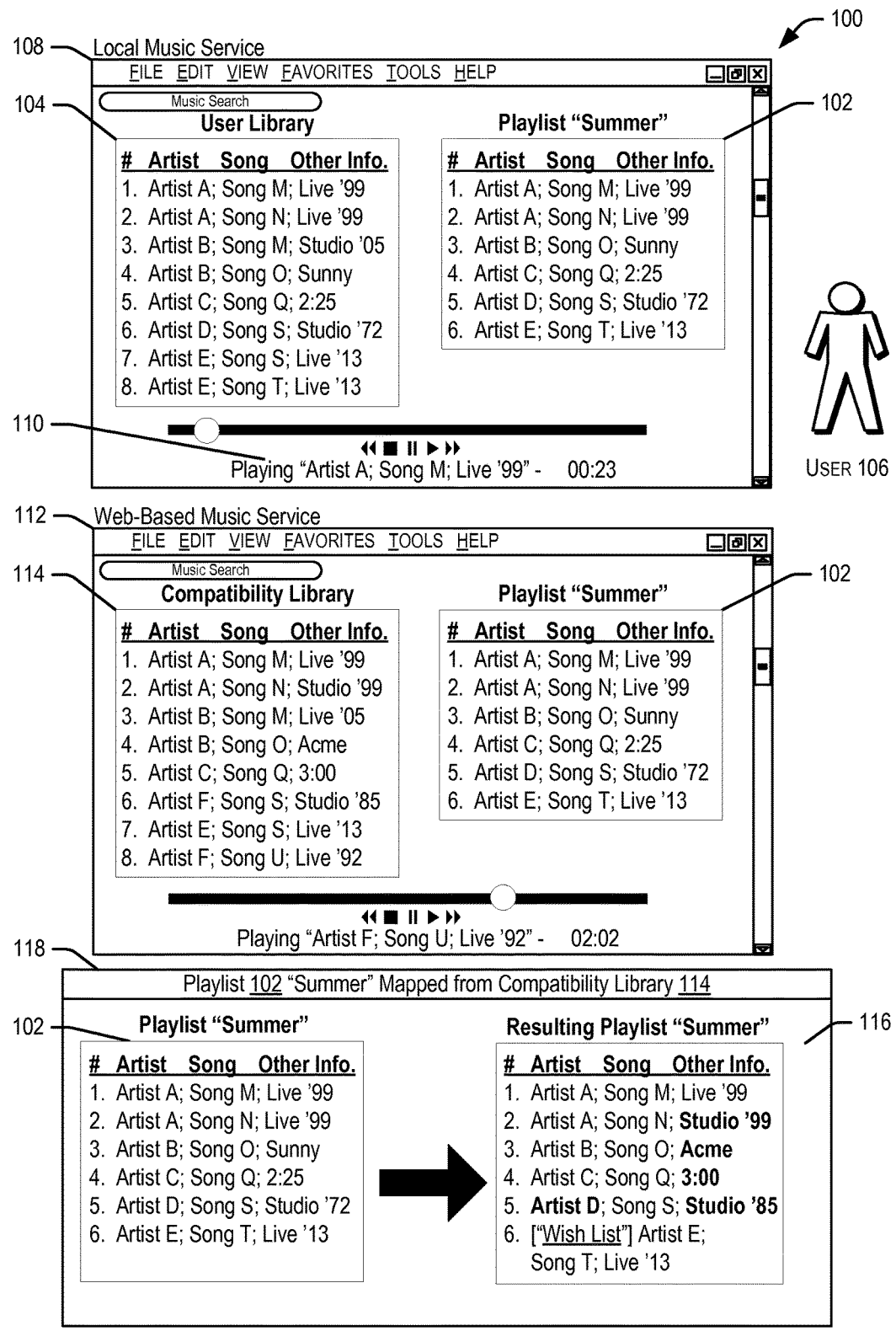
FIG. 1 illustrates an example diagram of mapping a playlist created from a first library to a second library using the playlist management system described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

It is understood that the embodiments and techniques described herein may be adapted to any type of electronic content item that may be added to a playlist including, for example, audio tracks, streaming audio configurations, audiobooks, video files, image files, etc.

Embodiments may also be configured to accept any audio, video, image or other format customary to those of skill in the art. For consistency and ease of discussion, this disclosure will primarily describe its embodiments and techniques in terms of audio files, music files, media files and/or audio tracks. However, such a discussion in no way limits the disclosure to those terms.

In some examples, a user may wish to use a music playlist of a first music service with a second music service. As such, the user may generate a playlist while accessing the first music service that includes songs sourced from the first music service. The second music service may then be configured to receive the music playlist from the user and attempt to match songs of the second music service in order to play the songs of the music playlist without interruption. In some examples, the second music service may look through a library of the second music service for exact bit matches of each track of the playlist. Songs that match at this level will be included the new playlist. In some examples, the second music service may not be able to locate an exact bit match for some tracks. In this case, the second music service may look through the library of the second music service for other compatible tracks. In some cases, the other compatible tracks may be reproductions with only minor variations due to the reproduction process, alternate performances of the same song by the same performers under the same conditions, alternate performances of the same song by the same performers under different conditions, different performances of the same song by different performers and alternate arrangements of the same song. In some aspects, once the new playlist is populated with songs sourced by the second music service, the second music service may be configured to play the new playlist to the user.

Additionally, in some examples, a user may wish to use a single media player to play a playlist that includes various songs sourced from different sources. For example, the user may be registered with a network based music service and may utilize a local music application of a computing device that includes songs stored locally. In some cases, the user may be able to make a playlist with a federated media player that is configured to allow the user to play a federated playlist that includes songs from both the network-based music service and the local music application (e.g., even if the two sources include song files that are encoded in different proprietary formats). The federated media player may be configured to access the network-based music service, the local music application and any other source from which the user may access songs (e.g., communicate with the proprietary format of each). From this access, the federated media player may be enabled to play the playlist. In some examples, the federated playlist may be at least partially populated with compatible tracks identified by a music service (e.g., such as the second media service discussed above) associated with the federated media player.

According to an example embodiment, a user may own or have access to a media library comprising electronic content items. For example, the user may have previously purchased and downloaded numerous audio tracks from an electronic marketplace. The audio tracks may be included in the media library and stored according to file directories on the user device. In some examples, a media player may be configured to organize and play the audio tracks based on the file directory location of the audio tracks. Thus, the audio tracks of the media library may be stored locally on a user device (e.g., personal computer, laptop, tablet computer, mobile device, etc.) or at another location (e.g., external hard drive, web-based storage, etc.). In other examples, the media library may comprise songs that the user has access to under a use agreement or limited license agreement (e.g., subscription streaming media service, free streaming media service, etc.). However, turning back to the current example, the user may arrange the audio tracks, using the audio player or other tool(s), into an example playlist. Similar playlists may comprise at least one audio track, but in this example, the playlist may comprise more than one audio track. Because the playlist may be specific to the user device (i.e., the playlist may rely on the storage directory location of each audio track on the user device in order to populate and play the playlist), it may be only playable on the user device. Thus, playing the playlist on a different media player, a different device or otherwise may prove cumbersome to the user.

However, according to embodiments herein, a system is described that may allow for the creation and/or transfer of the user's playlist to another location or service. Thus, the playlist may be playable on a plurality of user devices, media players and/or services. In this example, the system may identify the audio tracks that comprise the playlist using at least one of a plurality of methods described in more detail below. Based at least in part on the identification of the audio tracks of the playlist, the system may compare the identified audio tracks to a compatibility library of audio tracks. The compatibility library may, in some cases, comprise many audio tracks and may be organized according to compatibility or relatedness of the audio tracks in the compatibility library. Such an organization may be achieved, based at least in part, on a compatibility hierarchy. Next, the system may generate a new playlist, playable on a different device, media player and/or service, comprising audio tracks compatible with the audio tracks included in the user's original playlist. Thus, in at least this example, the new playlist may be similar to the original playlist and may be playable on a plurality of media players and/or services. In other examples, the new playlist may be identical or may include more or less audio tracks than the original playlist.

According to an additional example embodiment, the user described above may own or have rights to audio tracks, or other electronic content items, stored in a plurality of locations and/or associated with a plurality of media content services. For instance, the user's original playlist described above may, in this example, comprise audio tracks stored not only on the user device, but also in a web-based storage drive and may further comprise rights to play audio tracks as part of an online music streaming service. According to this example embodiment, the system may populate the playlist utilizing methods and techniques described above and in more detail below, based at least in part on audio tracks from the compatibility library. According to this second example embodiment, a federated media player may be provided. As part of the system, the federated media player may have access to the plurality of audio tracks included in the playlist, irrespective of the storage location of each particular audio track and/or the service according to which the user may have rights to the audio track. Thus, the federated media player may, under some examples, be configured to play playlists irrespective of the media player or service used to create the playlist and more notably, may be configured to play playlists comprising audio tracks from a plurality of different sources and/or services.

Embodiments of the present disclosure along with techniques described and suggested herein are directed to, among other things, classifying audio files in terms of compatibility. Classifying audio files in terms of compatibility may allow for the creation of generic music matches, or matches of audio files that are similar in some respect to an initial music file. In some examples, the initial audio file may be a song included in a user-created playlist. The playlist may include one or more songs. The user may have created the playlist previously on his or her own user device, in a web-based music service or by some other method. Moreover, the user may have created the playlist using a music service associated with the systems, embodiments and techniques described herein. Irrespective of how the user created the playlist, the songs included in the playlist may have identifying characteristics or information including, for example, identifiers inherent to the recording (e.g., length of audio recording, audio granularity, etc.), along with metadata stored as part of the audio file (e.g., artist, album, song title, year of recording, etc.). However, because the user may have created the playlist using any of a number of services, the precise audio files and associated identifying characteristics and/or metadata may not be recognizable by a service other than the one used for its creation. Thus, the user's ability to enjoy the playlist may be frustrated when he or she attempts to translate it from one service to a new service or attempts to create a similar playlist in the new service.

According to techniques described herein, the example song from the user's playlist described above may be identified at a high level of granularity and compared to a database of generic music matches populated according to embodiments described herein. This database of generic music matches may be utilized to determine whether the new service can play the song from the playlist or recommend songs with varying degrees of compatibility. For example, the database of generic music matches may be populated and sorted or arranged in terms of increasing compatibility. In other embodiments, the database may be sorted or arranged in terms of decreasing compatibility. For instance, a bitwise identical audio file (i.e., identical at a bit level) file may constitute a most compatible match. On the other hand, an audio file recorded at a date earlier than the user's song and/or in a different studio (thus, perhaps not bitwise identical) may constitute a less compatible match. Using this information, at least one embodiment described herein may notify the user of the degree of compatibility between the user's song and those in the database. The user may then decide whether the degree of compatibility is acceptable and if so may purchase the matching song from the new service or add it to a playlist located in the new service. If a threshold degree of compatibility is not met, the song may be retained in the playlist for the possibility of a future match. Other examples of user interaction with the generic music matches will be described in more detail below.

Additionally, the present disclosure may also be directed to providing federated media players capable of satisfying playlists of media files from a plurality of different media sources. For instance, users may often have rights (e.g., ownership, license, limited license, etc.) to media files that may be located in a plurality of locations. These locations may be physically separate from each other and/or logically separate. For example, a user may have media files stored locally on his or her personal computer, stored in a web-based storage system, accessible as part of a web-based subscription service and/or in other locations. In some examples, a user may want to create a playlist from media files stored in more than one location. In one example described herein, a federated media player is disclosed. According to this embodiment, a playlist, such as the one described above, may be satisfied (e.g., media files within the playlist may be played by the user) from the plurality of locations by the federated media player. Other examples and techniques for implementing federated media players will be described in more detail below.

FIG. 1 depicts an example diagram 100 in which techniques for managing playlists of media files may be implemented. These techniques and others are described in more detail below with reference to at least FIGS. 2-9. According to the embodiment shown in example diagram 100, playlist 102 may be created from electronic content files (e.g., audio tracks, video files, etc.) found in user library 104. While the user library 104 and the playlist 102 are shown to include three types of identifying information (i.e., "Artist," "Song" and "Other Info."), it is understood that local music service 108 may store more or less identifying information. The identifying information may be metadata stored in connection with the audio tracks from the user library 104. While audio track information shown in this example embodiment may include metadata, other information may also be stored in conjunction each track, the library or playlists discussed herein. Such information may include, for example, the length of the audio recording, the quality of the recording and/or other digital fingerprints of information.

In this embodiment, the playlist 102 is entitled "Summer" and is a compilation of six tracks by five different artists (i.e., "A, B, C, D and E"). As used herein, a playlist may be defined as a group comprising at least one media file sharing at least one characteristic. Oftentimes, as is the case with the playlist 102, playlists may be created around a particular theme or for a certain event. For example, a wedding playlist might include "Here Comes the Bride" and music suitable for dancing. In this example configuration, the playlist 102 is shown as having been created according to the theme of "Summertime." Playlists may be created by users, services, software and/or by any combination of the above. Thus, in some cases, playlists may be automatically created, populated and/or recommended to a user. For example, a playlist may be created that comprises the 25 songs played most often from the user's library of audio tracks. The playlist 102, in this example, may be created by user 106 from the user library 104. In other examples, the user library 104 may be stored in the local music service 108. The local music service 108 may comprise storage medium and control software (to create playlists, organize library, play music, etc.) executable on user devices such as, but not limited to, mobile devices, desktop computers, notebook computers, electronic book readers, tablet computing devices, etc. The local music service 108 may also include audio player 110 for playback of audio files located in the user library 104 and organized into the playlist 102.

By way of one non-limiting example, the user 106 may desire to transfer or move the playlist 102 from the local music service 108 to web-based music service 112. According to another example, the user 106 may desire to create the playlist 102 in the first instance using the web-based music service 112. For discussion purposes, the local music service 108 and the web-based music service 112 are assumed to have been developed by different entities and may therefore operate according to different protocols, organize playlists using different information, etc. Thus, direct compatibility between the two services may not be possible in some cases. However, according to techniques described herein, translation of the playlist 102 from the local service 108 to the web-based service 112 and/or creation of a playlist similar to the playlist 102 may be achieved by the web-based music service 112 utilizing compatibility library 114.

For example, the web-based music service 112 may analyze the playlist 102 created using the local music service 108 to determine which songs the user 106 has included in the playlist 102. After identifying the specific songs to be included in the playlist 102, the web-based music service 112 may establish a compatibility hierarchy for each song included in the playlist 102. An example sample of the most compatible songs from an example compatibility hierarchy is shown in the compatibility library 114 of the web-based music service 112. As discussed in more detail below, compatibility may be determined by analyzing each song in the playlist 102 and comparing the results of the analysis to a library of songs held by the provider of the web-based music service 112 to determine similarities and differences between the songs. According to embodiments described herein, after compatibility is determined, the compatibility hierarchy populated, the playlist 102 may be mapped to the compatibility library 114 and populated as resulting playlist 116.

According to the example diagram 100, differences between songs in the playlist 102 and those found in the compatibility library 114 are described below and may be shown in the resulting playlist 116. In other words, the resulting playlist 116 may be a playlist comprising those songs from the compatibility library 114 that may be most compatible with songs included in the playlist 102. Turning now to the first track in the resulting playlist 116 (shown in mapping window 118), track number "1" of the playlist 102 may be entirely compatible (i.e., a bitwise identical file) to a song (shown as track number "1" of the compatibility library 114) located by the web-based music service 112. In other words, the web-based music service 112 may have located a music file performed by "Artist A," titled "Song M" and performed "Live in '99"; thus meeting each element of information contained in the playlist 102. This entry may be shown as track number "1" in the resulting playlist 116.

However, for tracks "2" through "5" of the playlist 102 bitwise identical files may not have been found by the web-based music service 112. For instance, as shown in mapping window 118, track "2" of the playlist 102 comprises a track by "Artist A," titled "Song N" and recorded "Live in '99." According to the techniques described herein, the web-based music service 112 may identify a track by "Artist A," titled "Song N," but performed in the "Studio in '99" as the most compatible track to track number "2" of the playlist 102. Thus, the web-based music service 112 may include this compatible song in the resulting playlist 116 as track number "2." Other example differences are shown with reference to tracks "3" through "5" of the resulting playlist 116. These differences are shown by bolded text in the resulting playlist 116. For instance, track "3" of the resulting playlist 116 may be similar to track "3" of the playlist 102, with the exception that the track in the resulting playlist 116 may have been produced by studio "Acme" and not "Sunny." Track "6" of the playlist 102 comprises a song by "Artist E," titled "Song T" and recorded "Live in '13." According to the embodiment shown, the web-based music service 112 may not have identified a song adequately compatible to this track to have been populated in the resulting playlist 116. Thus, having not met a threshold degree of compatibility, a track compatible with track number "6" of the playlist 102 may not be included in the resulting playlist 116. However, the web-based music service 112 may provide the user 106 with an option to include the song in a "wish list." According to embodiments described herein, a "wish list" may be used to collect and store those songs (or other electronic content items) desired by a user (e.g., to be included in an existing or new playlist), but which are not currently available in the web-based music service 112. The user 106 may place the unavailable track into a "wish list" by clicking hyperlinked text, dragging and dropping the text to a specific location and the like.

Figure 2:
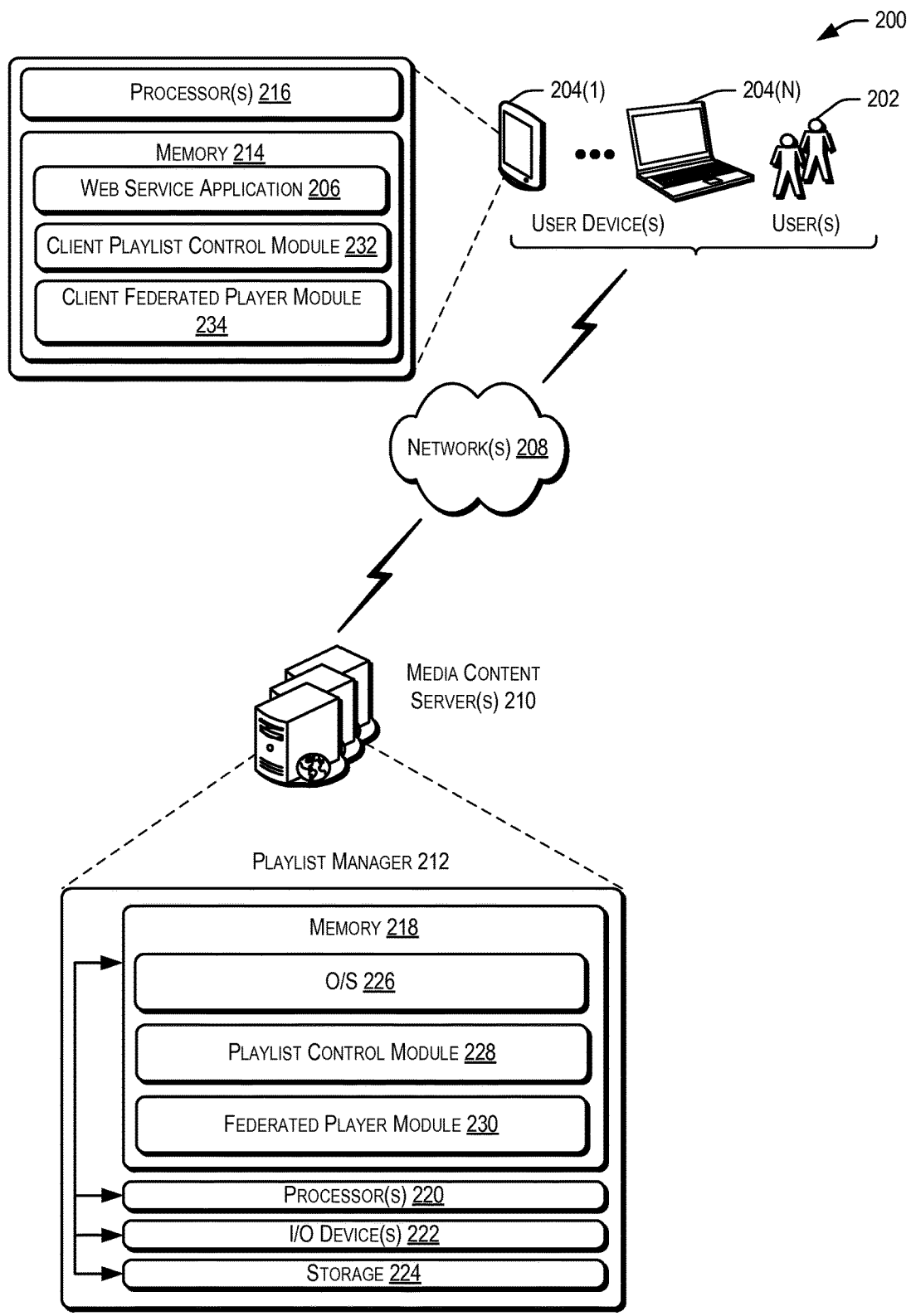
FIG. 2 illustrates an example architecture for implementing the playlist management system described herein, according to at least one example.

FIG. 2 depicts an illustrative system or architecture 200 for implementing the playlist management system described herein. In system 200, one or more users or customers 202 may utilize computing devices 204(1)-(N) (collectively, "user devices 204") to access a playlist manager 212 stored on a media content servers 210, via networks 208.

In some examples, the networks 208 may include any one or a combination of many different types of networks, such as cable networks, the Internet, wireless networks, cellular networks, and other private and/or public networks. While the illustrated example represents the users 202 accessing the playlist manager 212 over the networks 208, the described techniques may equally apply in instances where the users 202 interact with the playlist manager 212 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As noted above, the architecture 200 may include one or more user devices 204. The user devices 204 may be any type of computing device such as, but not limited to, a mobile phone, a smart phone, a personal digital assistant (PDA), a laptop computer, a desktop computer, a thin-client device, a tablet PC, etc. In some examples, the user devices 204 may be in communication with the media content servers 210 via the networks 208, or via other network connections.

The user devices 204 may include a web service application 206 within memory 206. The web service application 206 may allow the users 202 to interact with the playlist manager 212, such as to create, translate, import, and/or export playlists, and/or access, play, purchase, and/or rate audio files. The one or more media content servers 210, perhaps arranged in a cluster of servers or as a server farm, may host the web service application 206. Other server architectures may also be used to host the web service application 206. The web service application 206 may be capable of handling requests from many users 202 and serving, in response, various user interfaces that can be rendered at the user devices 204 such as, but not limited to interfaces related to the playlist management service 212. As discussed above, the described techniques can similarly be implemented outside of web service application 206, such as with other applications running on the user devices 204.

The memory 214 of the user devices 204 may store program instructions that are loadable and executable on the processor(s) 216, as well as data generated during the execution of these programs. Depending on the configuration and type of user devices 204, the memory 214 may be volatile (such as random access memory (RAM)) and/or non-volatile (such as read-only memory (ROM), flash memory, etc.). The user devices 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

As noted above, the playlist manager 212 may reside on one or more of the media content servers 210. According to one example embodiment, the playlist manger 212 may comprise memory 218, processor(s) 220, input/output device(s) 222 and storage 224. The memory 218 may store program instructions in the form of one or more software modules and may also store an operating system 226. These modules may include program instructions that are loadable and executable on processor(s) 220 to perform discrete tasks and to fulfill the purposes of the playlist manager 212. Modules shown as part of the playlist manager 212 are examples and other configurations performing other tasks and/or similar tasks as those described below may be implemented according to the techniques described herein. The operating system 226 may comprise any suitable operating system for controlling the hardware systems of the playlist manager 212. According to the architecture 200, the memory 218 may include a playlist control module 228 and a federated player module 230. Other modules (not shown) may perform the same tasks as the playlist control module 228 and the federated player module 230 or other tasks and may be implemented in a similar fashion or according to other configurations.

The processor(s) 220 may be configured to execute commands from the operating system 226, the playlist control module 228 and the federated player module 230. Depending on the configuration of the media content servers 210, the memory 218 may be volatile (such as random access memory (RAM)) and/or non-volatile (such as read-only memory (ROM), flash memory, etc.). The media content servers 210 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 218 may include multiple different types of memory, such as static random access memory (SRAM), dynamic random access memory (DRAM), or ROM.

The I/O device(s) 222 included as part of the playlist manager 212 may comprise any input and output devices to facilitate interaction with the playlist manager 212 by an operator or controller of the media content servers 210. The storage 224 may comprises databases and/or any other data structure for organizing media files. The storage 224 may include storage that may be volatile (such as random access memory (RAM)) and/or non-volatile (such as read-only memory (ROM), flash memory, etc.). The playlist manager 212 may also include additional removable storage and/or non-removable storage including, but not limited to, magnetic storage, optical disks, and/or tape storage. According to some embodiments, the storage 224 may be configured to store databases of electronic content items, including, for example, audio files, audiobook files, video files, and/or image files. Such databases may be referred to as libraries of electronic content items and, according to some techniques described herein, may be accessible by the playlist manager 212, the media content servers 210 and/or users 202 via network 208.

Similar to the memory 218 of the playlist manager 212, the memory 214 of the user devices 204 may store a client playlist control module 232 and a client federated player module 234. The operation of these two modules, 232, 234, may be similar to the operation of modules 228, 230 of the playlist manager as discussed in more detail below with reference to FIGS. 3 and 7. Thus, according to at least one embodiment, the operability of the playlist manager 212, described below, may be implemented on the user devices 204.

In some examples, the administrator, operator or proprietor of the media content servers 210 may negotiate contracts and/or licenses with other media content services (e.g., web-based streaming services, software-based online digital media stores, music vendors offering digital services, etc.) to give users 102 access to additional media content offered by the other media content services. Access to such additional media content may in some cases be provided as part of a service offered by the playlist manager 212 or as part of an additional service offered by the media content servers 210. In such an example, the proprietor of the media content servers 210 may be identified as an indirect licensee because its licenses to the media content depends on the other media content services. In other examples, the proprietor of the media content servers 210 may negotiate licenses directly with recording studios, performers, Performing Rights Organizations (PROs) (e.g., American Society of Composers, Authors, and Publishers (ASCAP); Broadcast Music, Inc. (BMI); Society of European Stage Authors & Composers (SESAC); etc.) and/or other copyright holders or licensees. In such an example, the proprietor of the media content servers 210 may be identified as a direct licensee. Thus, in some examples, the proprietors of the media content servers 210 may be entitled to offer media content under indirect licenses negotiated by the other media content services with studios, performers or PROs. According to an embodiment based at least in part on providing media over the media content servers 210 under indirect licenses, the media content servers 201 may track what media content is being accessed by the users 202 and whether it is media under a direct license or an indirect license. Such tracking may, in some examples, be utilized to calculate remuneration to the other media content services and/or charges associated with the access of the users 202.

Figure 3:
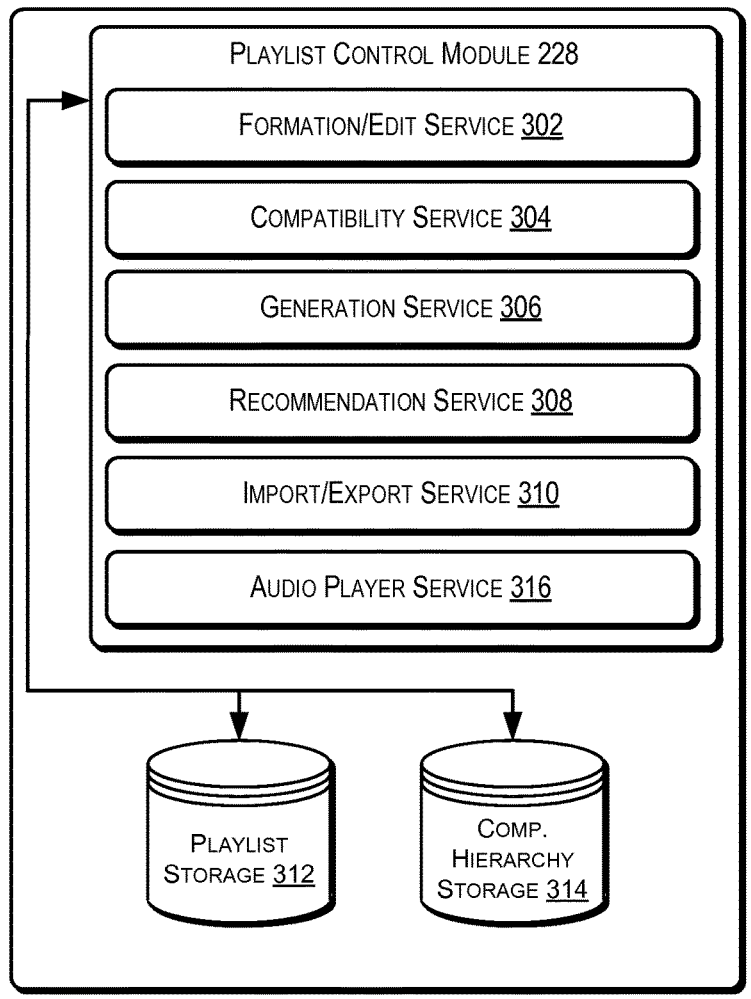
FIG. 3 illustrates an example architecture for implementing the playlist control module described herein, according to at least one example.

FIG. 3 illustrates an example architecture 300 for implementing the playlist control module 228. As discussed above, the playlist control module 228 may be configured to control a plurality of services. The playlist control module 228 may be implemented on software, hardware and/or firmware. The playlist control module 228 may comprise at least a formation/edit service 302, a compatibility service 304, a generation service 306, a recommendation service 308, an import/export service 310 and an audio player service 316.

The formation/edit service 302 may be implemented to allow the users or customers 202 to create and/or edit new and existing playlists. Forming a playlist, using the formation/edit service 302, may include, for example, selecting at least one media file (e.g., audio, video, image, etc.) from a plurality of known media files, selecting at least one media file from a plurality of recommended media files, selecting at least one media file from a plurality of previously-purchased media files, selecting at least one media file from a plurality of media files for purchase and/or selecting at least one media file from a previously-created playlist. Editing a playlist may include, for example, adding at least one media file to an existing playlist, removing at least one media file from an existing playlist, editing metadata associated with at least one media file included or not included in a playlist, identifying duplicate media files and/or removing duplicate media files. The formation/edit service 302 may also allow users 202 to perform other edits and/or manipulations to the media files in accordance with the knowledge of those of reasonable skill in the art.

According to some embodiments, the formation/edit service 302 may record a unique identifier for each media file user 202 adds to a playlist. This identifier may be associated with each media file and stored in playlist storage 312.

The playlist control module 228, including the formation/edit service 302, shown in FIG. 3, may have access to the playlist storage 312. The playlist storage 312 may comprise any form of storage medium including, for example, volatile (such as random access memory (RAM)) and/or non-volatile (such as read-only memory (ROM), flash memory, etc.). The formation/edit service 302 may access the playlist storage 312 to save new playlists created by the users 202 as discussed above. The formation/edit service 302 may also access the playlist storage 312 to save any edits, permutations, variations and/or changes to playlists, titles of playlists, non-metadata information associated with playlists and/or metadata associated with the media files included in the playlists. As discussed previously, formation of playlists and edits of playlists may be performed by the users 202 utilizing the playlist manager 212 via the user devices 204 or by software similar to the playlist control module 228 executable on the user devices 204. In other words, the playlist manager 212 may be implemented on the media content servers 210, on the user devices 204 or according to any other suitable configuration.

The playlist control module 228 may also include the compatibility service 304. The compatibility service 304 may be configured to populate a compatibility hierarchy storage 314. The users 202, utilizing the formation/edit service 302 or the import/export service 310 (discussed in more detail below), may create and/or import playlists to be populated and played on the media content servers 210 or the user devices 204. For each media file selected by users 202 to be included in a particular playlist, the compatibility service 304 may populate and store in the compatibility hierarchy storage 314 a group or set of compatible media files. According to some embodiments, the compatibility service 304 may determine compatibility or relatedness of a first media file selected by the users 202 (e.g., to compile a playlist) to a set of media files stored in the storage 224, on the media content servers 210 or in another location within network communication with the playlist control module 228. The compatibility service 304 may utilize the unique identifiers discussed above to associate the instances of the first media file selected by the users 202 to be included in a particular playlist.

According to some embodiments, the compatibility service 304 may organize the compatibility hierarchy in terms of compatibility levels. In some examples, the compatibility hierarchy may include a plurality of compatibility levels. In further embodiments, a compatibility hierarchy may be created, by the compatibility service 304, for the first media file selected by the users 202 and for subsequent media files selected by the users 202. In other words, for each media file selected by the users 202, the compatibility service 304 may create a compatibility hierarchy which may include a plurality of levels of compatibility or relatedness. In one example, the hierarchy may be organized in terms of descending compatibility. Thus, according to at least one example, the most compatible media files identified by the compatibility service 304 may be in a first position, with less compatible media files occupying subsequent positions.

In another example embodiment, the compatibility hierarchy may comprise a ranked list of compatibility measures. According to this embodiment, compatibility measures may comprise differing degrees of match (e.g., exact match, reproduced item match, alternate and same item match, alternate and different item match, different performance item match and/or variation item match) to the media file selected by the users 202 to be included in his or her playlist.

According to at least one embodiment, the compatibility service 304 may determine the identity of the media file (e.g., song) selected by the user and next determine the compatibility levels. To determine the identity, the compatibility service 304 may look to the title or arrangement of the song given by the users 202. According to another embodiment, the compatibility service 304 may analyze the metadata associated with the song selected by the users 202 to be included in the playlist. Such an analysis may reveal, for example, information relating to title, artist, album, year, comment, track number, genre, speed, start-time and/or end-time of each song. This information may be adequate for the compatibility service 304 to identify the song. After which, the compatibility service 304 may begin to look for compatible or related songs within the media content servers 210 to be included in the compatibility hierarchy.

However, under other conditions, the metadata may be inaccessible to the compatibility service 304 and/or corrupt, missing, and/or inadequate for compatibility service 304 to determine the identity of the song. In such a case, the compatibility service 304 may attempt to identify the song using other techniques. For example, the compatibility service 304 may utilize an algorithm that compares the audio fingerprint of the song to the audio fingerprints of other songs stored in databases associated with the media content servers 210. In another embodiment, the compatibility service 304 may hash the song to determine whether the song is a bitwise identical song to one stored on the media content servers 210. In other embodiments, the compatibility hierarchy may have been created prior to the identification step discussed above.

In yet another example, the compatibility service 304 may perform at least one type of Fourier transformation of the song to determine its identity and compatibility to other songs. In other cases, the compatibility service 304 may perform more than one type of transformation to attain its intended results. Using such transformative techniques, according to some embodiments, may be enable the compatibility service 304 to remove outlying noise information and identify the smallest variations between a plurality of songs. For example, such a transformation may be best suited for analyzing songs in one of the highest levels of compatibility (e.g., reproductions of the same song with only minor variations) and determining the relatedness of the songs. According to other embodiments described herein, the compatibility service 304 may utilize a form of Rabin chunking to determine degree of similarity between a plurality of songs. According to other embodiments, the compatibility service 304 may have access to a database of lyrics from which it may be able to determine compatibility.

According to this embodiment and other similar embodiments, the compatibility service 304 may utilize an edit distance algorithm to account for spelling, formatting and/or other minor differences between lyrics and to account for minor differences in metadata. The edit distance algorithm may be associated with a plurality of thresholds below or above which a song may be considered compatible, or at least to fall within a level of compatibility.

Once the compatibility service 304 has identified the song selected by the users 202 to be included in the playlist, the compatibility service 304 may determine the compatibility of the song to those stored on the media content servers 210. In addition, the compatibility hierarchy may have been created prior to the users 202 request to create a new playlist or transfer an existing playlist. Such a configuration may be desirable to enable a quicker response on the determination of relatedness of media files accessible by the playlist control module 228. As briefly discussed above, the results of the compatibility determination may be stored in the compatibility hierarchy storage 314 and divided into compatibility levels. According to at least one embodiment, a first compatibility level may comprise songs determined to be bitwise identical to the users' 202 song. In another example, a second compatibility level may comprise songs that appear to be reproductions of the same content with only minor variations due to the reproduction processes. In yet another example, a third compatibility level may comprise songs representing alternate performances of the same content by the same performers under the same conditions. In still another example, a fourth compatibility level may comprise songs representing alternate performances of the same content by the same performers under different conditions (e.g., live performance verses a studio performance). In another example, a fifth compatibility level may comprise songs representing different performances of the same content by different performers (e.g., same lyrics performed by different artists). In yet another example, a sixth compatibility level may comprise songs representing variations of on the content (e.g., alternate arrangements).

In each example presented above, each level, some levels, and/or all levels may have at least one song, more than one song, and/or no songs. Additionally, in some embodiments, the users 202 may designate a minimum and/or maximum amount of variation allowable for the compatibility service 304 to tolerate when designated a song as "compatible" with the users' 202 song from his or her playlist. In another example, the users 202 may designate via the user devices 204 a threshold degree of compatibility desired such that songs which do not attain the designated threshold and/or do not have any degree of match may be automatically excluded. The users 202 may also designate preferences for certain venues, artists, genre, etc. For example, the user may designate that between a "live" and "studio" recording, the users 202 prefer a "studio" recording. Such preferences, along with others, may be supplied to the compatibility service 304 to increase its accuracy of determining compatibility and to tailor its generated playlists (see discussion below) to the users' 202 preferences.

In yet another example, the playlist control module 228 may present the users 202 with a list of possibly-compatible songs populated by the compatibility service 304. After such presentation, the users 202 may interact with the possibly-compatible songs by designating (e.g., clicking a "thumps up" or "thumbs down" or selecting the songs to keep as "compatible") those which the users 202 may find compatible or those which the users 202 may deem incompatible or less compatible. These designations may be logged by the playlist control module 228 or other device and may be used by the compatibility service 304, among others, to increase its accuracy in determining compatibility. These user preferences along with other user profile data (e.g., demographic data, service access credentials, etc.) may be stored as part of the playlist manager 212, media content servers 210, and/or in other related storage areas accessible by the playlist control module 228.

Turning next to the generation service 306 of the example architecture 300 shown in FIG. 3. The generation service 306 may have access to the playlist storage 312 and the compatibility hierarchy storage 314. According to embodiments disclosed herein, the generation service 306 may utilize the playlist desired by the users 202 and the compatibility hierarchy to generate a new playlist comprising the closest matches available from the media content servers 210. As discussed above, the generation service 306 may also utilize user preferences when creating and presenting the new playlist to the users 202.

According to other embodiments, the generation service 306 may retain those songs desired by the users 202 to be included in the playlist, but for which there may not have been a match. Retaining such songs, according to some embodiments, may allow for the possibility of a future match. Such a future match may be recommended to the users 202 for purchase or use by recommendation service 308, such as to include the song in a "wish list." According to other embodiments, the songs included in the playlists generated by the generation service 306 may retain their original media identity.

The recommendation service 308 of the architecture 300 may, according to some embodiments, present the users 202 with opportunities to select songs to compile playlists. For example, according to one embodiment, the recommendation service 308 may provide the users 202 with a palette of recommended songs. These songs may, according to some embodiments, have been processed by the compatibility service 304 and/or arranged in the compatibility hierarchy storage 314. Thus, in some embodiments, the users 202 may be presented with recommended songs arranged by compatibility (e.g., within a set of compatibility levels). In other embodiments, the recommended songs may be located in a local storage on the user devices 204, a web-based storage associated with the users 202 and/or in any other service or database which the users 202 may have access. In some embodiments, the playlist control module 228 may be enabled to play the songs recommended by the recommendation service 208 and other songs located in a plurality of locations using the methods and techniques described with reference to the federated player module 230. In other embodiments, the playlist manager 212 may request access to the other storage locations and/or services by communicating such a request to the users 202 or by communicating directly with the other storage locations and/or services.

In yet other embodiments, the recommendation service 308 may present the users 202 with opportunities to purchase the songs for which a match (i.e., some level of compatibility) may have been identified from a database of songs owned by the proprietors of the media content service 210. In other embodiments, the recommendation service 308 may recommend that the users 202 purchase songs similar to or complimentary of those songs included in the users' 202 playlist(s) and/or the playlist generated by the generation service 306. If the users 202 choose not to purchase the song presently, the recommendation service 308 may provide the users 202 with an opportunity to place the song in a "wish list" or to purchase at a later time. According to other embodiments, the users 202 may designate with whom to share the wish list information such that others may purchase the recommended songs on behalf of the users 202. The recommendation service 308 may also, according to some embodiments, provide an opportunity for the users 202 to review, rate and/or comment on songs included in his or her playlist and/or other songs not on his or her playlist. This information, along with other information provided by the users 202 and collected from the users' 202 interaction with the media content service 210 may be used to tailor the playlist manger's 212 services to other users and the users 202.

According to embodiments described herein, the playlist control module 228 may also include the import/export service 310. The import/export service 310 may be utilized by the playlist control module 228 to enable the users 202 to import existing playlists from different services and/or different storage locations. According to another embodiment, the import/export service 310 may be used to translate imported playlists to formats recognizable by the playlist control module 228. Such a translation may, according to other embodiments, allow the playlist control module 228 to perform operations, such as those described above, on the imported playlists. The import/export service 310 may also allow the users 202 to export playlists generated by the generation service 306, imported by the import/export service 310 and/or created automatically by the playlist manager 212 or by the users 202 utilizing operations available within the playlist manager 212. According to embodiments described herein, the users 202 may be able to freely share or loan playlists exported by the import/export service 310 with friends, family, other users, etc. In other embodiments, the playlist manager 212 may restrict the exportation of playlists.

According to embodiments described herein, the playlist control module 228 may also include an audio player service 316. The audio player service 316 may support typical audio playback functions such as, for example, stop, play, pause, scan forward, scan backward, skip forward, skip backward, looping play, random shuffle, automatic volume adjustment, etc. The audio player service 316 may, according to some embodiments, be operable within a browser window on the user devices 204 via networks 208. According to other embodiments and depending on the location of the playlist manager 212 (i.e., stored on the media content servers 210, on the user devices 204, spread between the two or elsewhere) the audio player service 316 may be included within software, a software-based application, firmware, etc.

Figure 4:
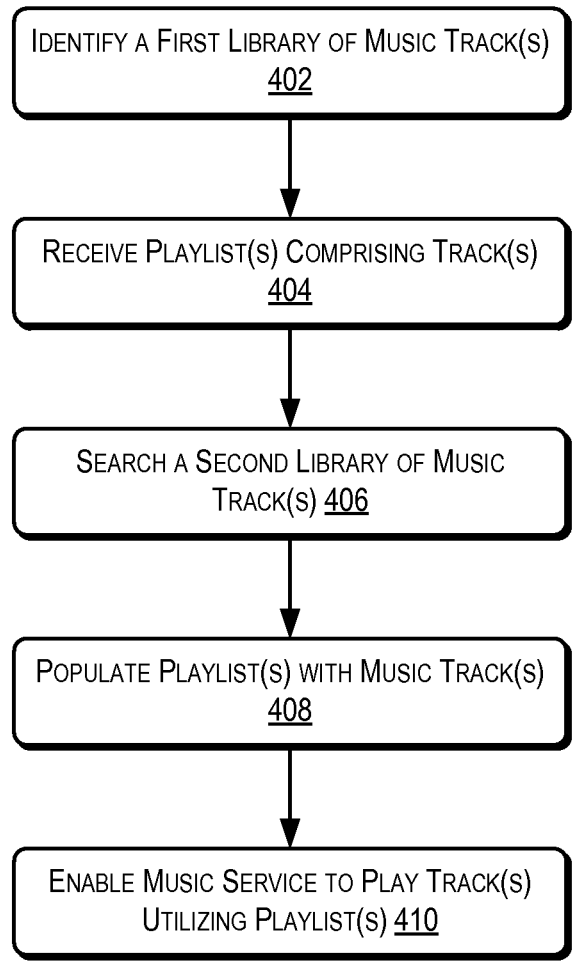
FIG. 4 illustrates an example flow diagram of a process for implementing the playlist management system described herein, according to at least one example.
Figure 5:
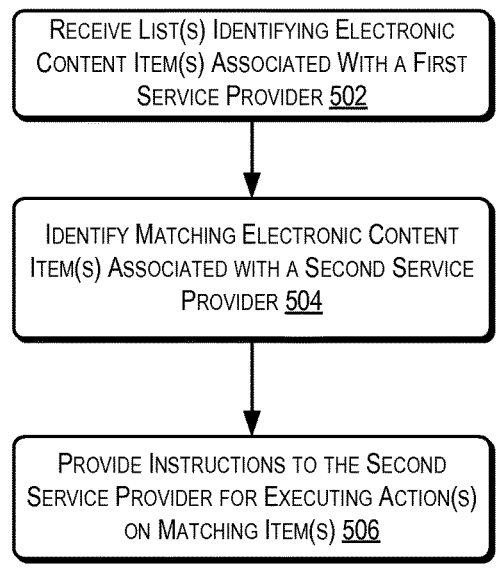
FIG. 5 illustrates an example flow diagram of a process for implementing the playlist management system described herein, according to at least one example.
Figure 6:
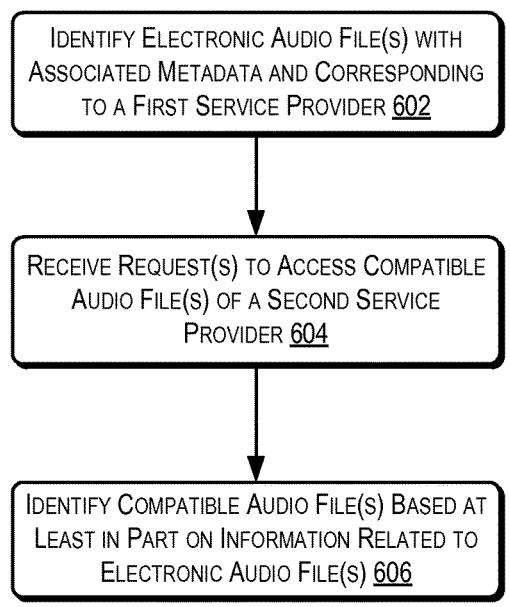
FIG. 6 illustrates an example flow diagram of a process for implementing the playlist management system described herein, according to at least one example.

FIGS. 4-6 illustrate example flow diagrams showing respective processes 400-600 for managing media content across services. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 4 depicts an illustrative flow diagram showing process 400 for managing media content across services. The media content servers 210 shown in FIG. 2 may perform the process 400 of FIG. 4. The process 400 begins by identifying a first library of music tracks at 402. According to process 400 described at 402, the music tracks may be associated with a music service. The music service, in some examples, may enable the generation of playlists from the first library of music tracks, and, in some examples, the music tracks may include metadata. At 404, the process 400 may receive, by the media content servers 210 or by one or more computers comprising the media content servers 210, playlists comprising the one or more of the music tracks of step 402. At 406, process 400 may search a second library of music tracks. For example, process 400 may search the second library to identify at least one track from the playlist received at step 404. As discussed above, this identification may be based at least in part on a compatibility hierarchy. The compatibility hierarchy may comprise, for example, a plurality of compatibility levels which may be based at least in part on corresponding metadata of the one or more tracks identified in step 402 and metadata corresponding to respective tracks from the second library of tracks. At 408, process 400 may populate playlist(s) with the matching track(s) identified at 406 such that the playlist generated by the first music service at 402 is playable with respective tracks of the second library of music tracks. At 410, process 400 may enable the second music service to play the respective tracks of the second library of music tracks utilizing the playlist.

FIG. 5 depicts an illustrative flow diagram showing process 500 for managing media content across services. The media content servers 210 shown in FIG. 2 may perform the process 500 of FIG. 5. The process 500 begins at 502 by receiving list(s) identifying electronic content items. In one example, process 500 may identify electronic content item(s), and at least one item may be associated with a first service provider. At 504, process 500 may identify a matching item associated with a second service provider that may correspond to the electronic content item(s) identified at 502. In one example, this identification may be based at least in part on a compatibility hierarchy. At 506, process 500 may provide instructions to the second service provider for executing an action (e.g., playing) on the matching item in place of the item received at 502.

FIG. 6 depicts an illustrative flow diagram showing process 600 for managing media content across services. The media content servers 210 shown in FIG. 2 may perform the process 600 of FIG. 6. The process 600 begins at 602 by identifying electronic audio file(s) with associated metadata and corresponding to a first service provider. At 604, process 600 may receive a request to access compatible audio file(s) of a second service provider. At 606, process 600 may identify compatible audio file(s) from 604 based at least in part on information related to the electronic audio file(s). In some examples, the identification of compatible media files at 606 may utilize compatibility hierarchies. The compatibility hierarchies may, in some examples, search files of the second service for exact match(es), for reproduction match(es) when no exact match(es) are found, for alternate match(es) when no production match(es) are found, for different match(es) when no alternate match(es) are found and/or for variation match(es) when no different match(es) are found.

Figure 7:
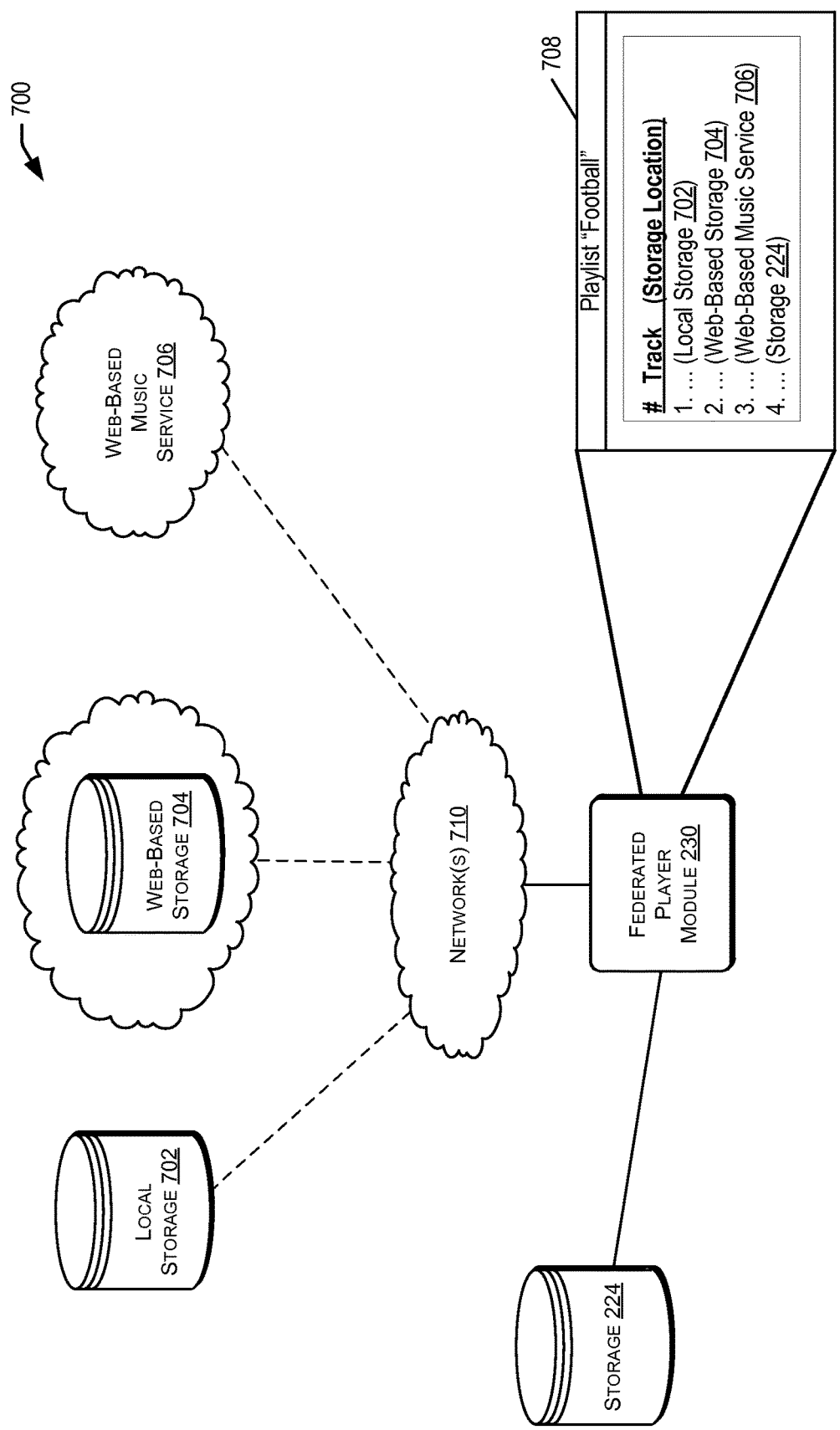
FIG. 7 illustrates an example architecture for implementing the federated player module described herein, according to at least one example.

FIG. 7 depicts an illustrative system or architecture 700 for implementing the federated player module 230 of architecture 200. According to embodiments of the present disclosure, the federated player module 230 may operate to play song lists or playlists where the actual songs may be saved or stored in a plurality of locations and/or licensed from a plurality of sources. In one non-limiting example, the users 202 may create playlists from a libraries of songs located on user devices 204. Such playlists may be specific to the user devices 204 because the system for storing the playlists on the user devices 204 may, in some cases, utilize a file path directory to locate the audio files included in the playlist. If the audio files are moved to a different location (i.e., found at a different file path director), the playlist may not be playable on the user devices 204. However, in some cases, as discussed above, the users 202 may want to import all or part of a playlist from one service to another service. According to embodiments disclosed herein, such a transfer may be achieved using the import/export service 310 explained with reference to FIG. 3. In other cases, the users 202 may have purchased music from a plurality of services. Thus, the users' 202 music may not all be stored in one location or with one service.

Turning now to the details of FIG. 7, the federated media player 230 is illustrated along with a plurality of locations where the users' 202 media files may be stored. In this example architecture 700, the federated media player 230 shares a connection with the, local storage 702, web-based storage 704 and web-based music service 706 via network(s) 710. The storage 224 is also included as part of the playlist manager 212; thus, sharing a connection with the federated player module 230. While the architecture 700 is shown in FIG. 7 comprising the federated media player 230 connected to the above-listed storage locations via network 710, it is understood that more or less, physical or web-based locations may be implemented using the embodiments and techniques described herein. Each storage location and service illustrated in FIG. 7 may be connected to the federated media player 230 via the networks 710 or any other method providing connectivity between the federated media player 203 and/or other storage locations and music services. In some examples, the networks 710 may include any one or a combination of many different types of networks, such as cable networks, the Internet, wireless networks, cellular networks, and other private and/or public networks. As discussed above, the federated player module 230 may be configured to control a plurality of services. As discussed in more detail with reference to FIG. 2, the federated player module 230 may be implemented on software, hardware, firmware, etc.

Turning first to the storage 224, the storage 224 from the playlist manager 212 is depicted as sharing a connection with the federated media player 230 as illustrated and discussed with reference to FIG. 2. The storage 224 may include audio files used to populate the compatibility hierarchy and may be accessible to the federated media player 230 via the media content servers 210.

The federated media player 230 may have access to the local storage 702 via network 710. In some examples, the local storage 702 may comprise audio files stored on the user devices 204. The federated media player 230 may also have access to the users' 202 web-based storage 704 via the network(s) 710. According to some examples, the web-based storage 204 may comprise a "cloud-drive," a remotely connected drive, a shared drive not physically connected to the user devices 204 and/or any other storage location that is not local to the user devices 204 nor hosted by a third-party to supply media content. The web-based music service 706, on the other hand, may be hosted by a third-party to supply music or other media content. According to embodiments disclosed herein, the web-based music service 706 may include the capability for the users 202 to search, store, manipulate and/or play music over a network connection. In some instances, the users 202 may stream from the web-based music service 706, music that he or she purchased from the web-based music service 706. In other cases, the users 202 may be entitled to stream music hosted by the web-based music service 706 as part of a quid-pro-quo arrangement. In the strictest sense, the users 202 may be entitled to stream the media content because he or she has paid an amount of money for the streaming service. In another arrangement, the users 202 may be entitled to stream media content so long as he or she agrees to listen to occasional commercial interruptions. On each of the storage locations discussed above (and music services), the users 202 may manage and/or organize the way his or her music is played, including building and manipulating playlists.

FIG. 7 also includes playlist 708. According to this example, the playlist 708 is entitled "Football" and may include audio tracks that the users 202 associated with the sport of football. According to embodiments disclosed herein, the playlist 708 may be created using the playlist manager 212. In this example, the playlist 708 may be organized by #, track and storage location. For ease of presentation the "Track" name has been omitted and the storage location is shown in parenthesis. According to the embodiment depicted in FIG. 7, track "1" may be stored in the local storage 702, track "2" may be stored in the Web-based storage 704, track "3" may be located in connection with the web-based music service 706 and track "4" may be stored in the storage 224.

Each track of playlist 708 may have been encoded according to at least one of many proprietary formats (i.e., "source encoding"). This source encoding may have been performed by the service or application utilized by the user to manage the respective track and/or create the playlist 708. For example, by virtue of different storage locations and/or services associated with each track of the playlist 708, the source encoding of track "1" may be different than the source encoding of track "2" In some examples, the federated media player 230 may be configured to identify the formats of the source encoding of each respective track of the playlist 708. In addition to identifying the source encoding formats, the federated media player 230 may, in some examples, be configured to decode the source formats and/or recode the source formats of each track of the playlist 708 to a federated format. The federated format may be a format readable by the federated media player 230 to enable it to play the playlist 708 comprising songs from different sources and encoded according to different formats. In some examples, the encoding may be the same or similar for each respective track of the playlist 708 and the recoding may comprise encoding each track according to the federated format.

In other embodiments, the federated media player 230 may access the playlist storage 312 and/or the compatibility hierarchy storage 314. Such access may, in some examples, allow the federated media player 230 to aggregate, federate or otherwise combine media tracks for which the playlist control module 228 previously performed operations. For example, the federated media player 230 may play audio tracks identified by the compatibility service 304 and/or playlists created by the generation service 306.

Because the tracks that comprise the playlist 708 are stored or accessed in different logical and/or physical locations, the federated player module 230 may identify which media services and/or storage locations are associated with each individual track. According to another embodiment, the federated player module 230 may determine an access route for accessing each track included in the playlist 708. In one example, the federated player module 230 may attempt to reach each storage location and/or media service by sending a digital communication to each requesting access to each track included in the playlist 708. In some embodiments, the users 202 may be asked by one or more of the services or storage locations to allow access to the media content servers 210 on which the federated player module 230 is operating. In other cases, the federated player module 230 may reside on the user devices 204. Once access has been granted to the federated player module 230, the federated player module 230 may identify the compatible tracks as listed in the playlist 708 and allow user interaction with the tracks (e.g., play, shuffle, scan, etc.).

Figure 8:
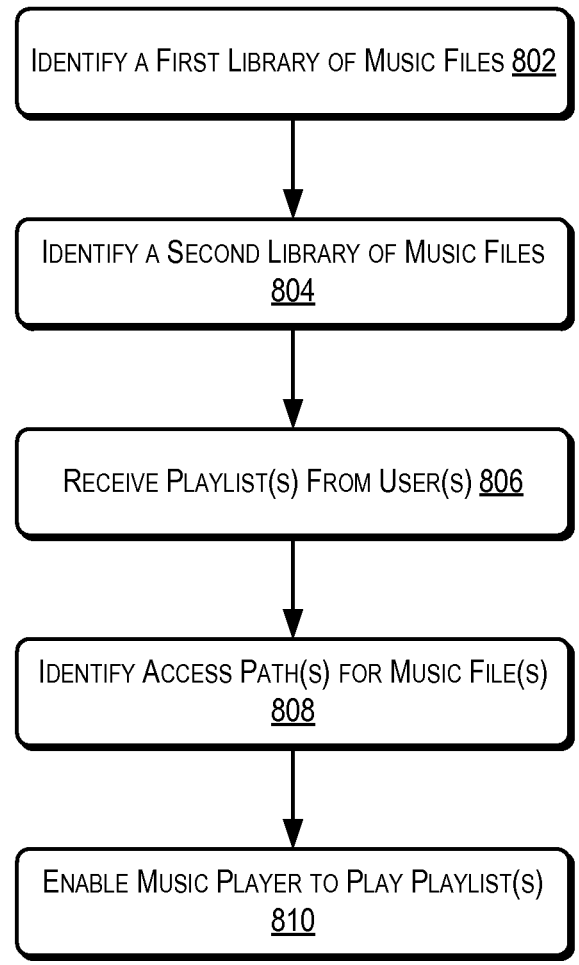
FIG. 8 illustrates an example flow diagram of a process for implementing the playlist management system described herein, according to at least one example.
Figure 9:
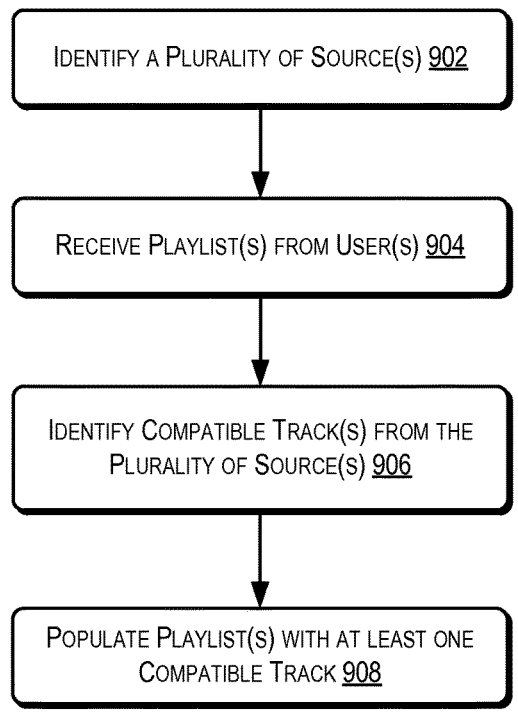
FIG. 9 illustrates an example flow diagram of a process for implementing the playlist management system described herein, according to at least one example.
Figure 10:
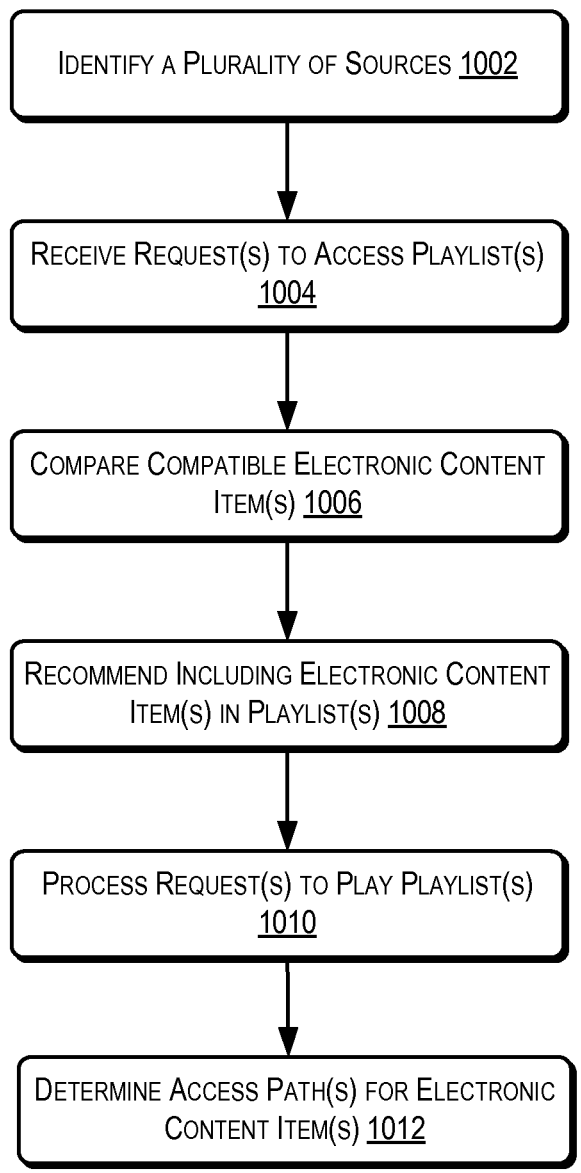
FIG. 10 illustrates an example flow diagram of a process for implementing the playlist management system described herein, according to at least one example.

FIGS. 8-10 illustrate example flow diagrams showing respective processes 800-1000 for managing media content across services. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 8 depicts an illustrative flow diagram showing process 800 for managing media content across services. The media content servers 210 shown in FIG. 2 may perform the process 800 of FIG. 8. The process 800 may begin at 802 by identifying a first library of music files. In some examples, the first library of music files may store a first set of music files accessible by a user. At 804, the process 800 may identify a second library of music files. The second library of music files may comprise a second set of music files and be accessible by the user. In some examples, the first library and the second library may store their respective music files according to distinct directories. At 806, the process 800 may receive playlist(s) from user(s), in some examples, the playlist(s) may be playable by a music player and comprise at least one music file from the first set of music files of 802 and at least one music file from the set of music files of 802. At 808, for each music file of the playlist, the process 800 may identify access path(s) to at least the first library, the second library, and a compatibility library. In some examples, the compatibility library may comprise music files arranged based at least in part on information associated with at least one music file of the playlist. At 810, the process 80 may enable the music player to play the playlist(s).

Turning next to FIG. 9, an illustrative flow diagram showing process 900 for managing media content across services is depicted. The media content servers 210 shown in FIG. 2 may perform the process 900 of FIG. 9. The process 900 may begin at 902 by identifying a plurality of sources. By way of example, each of the sources may be configured to manage independent set(s) or audio files. At 904, the process 900 may receive playlist(s) from user(s). In some embodiments, playlist(s) may identify list(s) of audio file(s) to be played by media player(s). At 906, the process 900 may identify compatible track(s) from at least one of the plurality of sources identified at 902. In some examples, the identification at 906 may be based at least in part on compatibility hierarchies. At 908, the process 900 may populate playlist(s) with at least one compatible track(s) identified from the plurality of sources.

FIG. 10 depicts an illustrative flow diagram showing process 1000 for managing media content across services. The media content servers 210 shown in FIG. 2 may perform the process 1000 of FIG. 10. At 1002, the process 1000 may begin by identifying a plurality of sources. In some examples, each source of the plurality may comprise electronic content items. At 1004, the process 1000 may receive request(s) to access playlist(s). The playlist may, in some examples, comprise at least one electronic content item from the plurality of sources. At 1006, the process 1000 may compare compatible electronic content items with at least one electronic content item of the playlist. Such a comparison may, under some examples, be performed to determine match electronic content items. The compatible electronic content items compared at 1006 may, in some examples, be populated by at least one of the plurality of sources. At 1008, the process 1000 may recommend including at least one of the match electronic content items in the playlist. At 1010, the process 1000 may process a request to play the playlist including at least one of the match electronic content items. At 1012, the process 1000 may determine an access path for each electronic content item. Such a determination may, in some examples, depend at least in part on source type.

Figure 11:
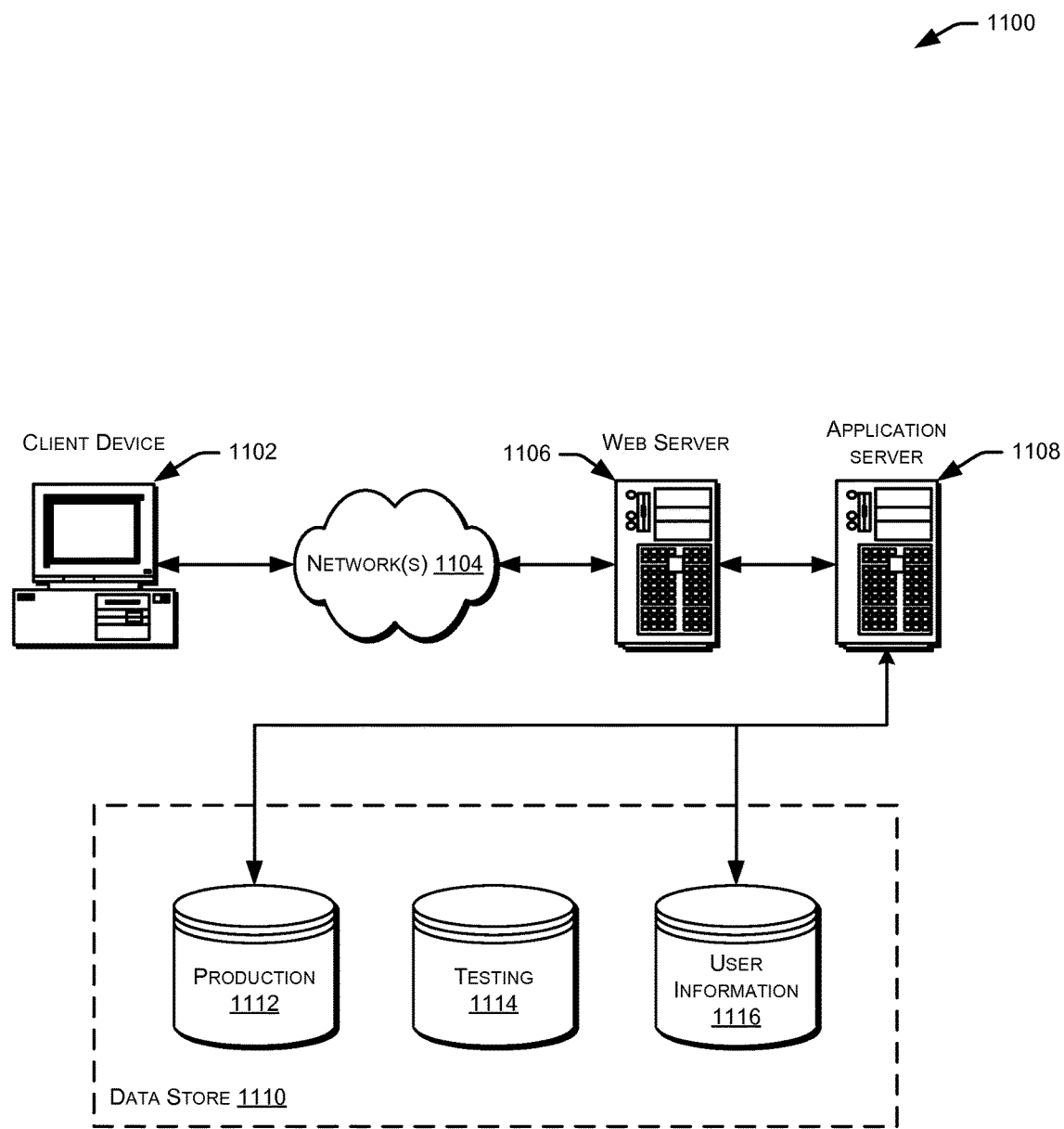
FIG. 11 illustrates an example environment in which various embodiments of the playlist management system described herein can be implemented, according to at least one example.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102.

Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example-like language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the described embodiments. Variations of those preferred embodiments may become apparent to those of ordinary skill in the art upon reading the foregoing description. The inventors expect skilled artisans to employ such variations as appropriate and the inventors intend for the embodiments disclosed herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
   identifying a first library of a user configured to manage a first set of music files accessible by the user;
   identifying, by a computer system, a second library of the user configured to manage a second set of music files accessible by the user, the first library and the second library storing respective music files according to distinct directories;
   receiving a playlist from the user, the playlist arranged in a list comprising at least one music file from the first set of music files and at least one music file from the second set of music files;
   determining a set of music files of the playlist that is unplayable on a first music player, the set of music files comprising at least a first music file from the first set of music files or a second music file from the second set of music files, the first music player used to create the playlist and associated with the first library or with the second library;
   for at least one music file of the set of music files, identifying an access path to
   a compatibility library, music files of the compatibility library arranged based at least in part on a compatibility hierarchy that is particular to the at least one music file of the playlist, the compatibility hierarchy comprising a plurality of match levels;
   updating the playlist based on the identified access path; and
   enabling a second music player to play the playlist.

2. The computer-implemented method of claim 1, further comprising requesting, from the first library, access to the first set of music files and requesting, from the second library, access to the second set of music files prior to enabling the second music player to play the playlist.

3. The computer-implemented method of claim 1, wherein the first library is associated with a storage device of the user and the second library is associated with a music service configured to provide music files over a network to the user.

4. The computer-implemented method of claim 1, wherein the playlist comprises at least one of the music files of the compatibility library.

5. The computer-implemented method of claim 1, wherein the plurality of match levels comprises at least two of a bitwise identical file, a bitwise near-identical file, a reproduced file with variations below a threshold, an alternative performance by a same performer under same conditions, a second alternative performance by the same performer under different conditions, or a different performance by a different performer.

6. A computer-readable storage device storing computer-executable instructions that, when executed by one or more computer systems, configure the one or more computer systems to perform operations comprising:
   identifying a plurality of sources associated with a same user, each of the plurality of sources associated with an independent media content library respectively configured for each of the plurality of sources;
   receiving a playlist identifying media files of the plurality of sources to be played by a media player, at least one media file of the media files available in at least one respective configuration of at least one of the plurality of sources;

creating a compatibility hierarchy that is particular to the at least one media file of the media files of the playlist, the compatibility hierarchy comprising a plurality of hierarchy levels, each hierarchy level corresponding to a relative degree of relatedness between a respective media file and the at least one media file;

in response to creating the compatibility hierarchy, for the at least one media file, identifying, based at least in part on the plurality of hierarchy levels and a compatibility threshold, a compatible media file from at least one of the plurality of sources; and populating the playlist with the compatible media file identified from the at least one of the plurality of sources.

7. The computer-readable storage device of claim 6, wherein the plurality of hierarchy levels comprises at least two of a bitwise near-identical file, a reproduced file with variations below a threshold, an alternative performance by a same performer under same conditions, a second alternative performance by the same performer under different conditions, or a different performance by a different performer.

8. The computer-readable storage device of claim 6, wherein the plurality of sources comprises a local storage device of the one or more computer systems, a storage device external to the one or more computer systems, or a service provider accessible over a network.

9. The computer-readable storage device of claim 6, wherein files of each respectively configured media content library are formatted to be played with a media player of an associated source.

10. The computer-readable storage device of claim 6, wherein the one or more computer systems is further configured to perform operations comprising enabling the media player to play the populated playlist.

11. The computer-readable storage device of claim 6, wherein the same user comprises a user of the media player, the playlist being received from the user of the media player.

12. A system, comprising:
a memory that stores computer-executable instructions; and
a processor configured to access the memory and execute the computer-executable instructions to collectively at least:
identify a plurality of sources associated with a same user, each source comprising electronic content items;
receive a request to access a playlist, the playlist comprising information identifying at least one electronic content item from each of the plurality of sources;
determine a set of compatible electronic content items based at least in part on a set of compatibility hierarchies, each compatibility hierarchy comprising a plurality of hierarchy levels, each hierarchy level corresponding to a relative degree of relatedness between an electronic content item of the playlist and a subset of the set of compatible electronic content items;
compare, in accordance with a compatibility threshold, the set of compatible electronic content items with a first electronic content item of the playlist to determine at least one matching electronic content item;
recommend including the at least one matching electronic content item in the playlist;
process a request to play the playlist, the playlist including the at least one matching electronic content item; and
determine, based at least in part on a source type, an access path for the at least one electronic content item of the playlist.

13. The system of claim 12, wherein at least one source of the plurality of sources comprises a web-based storage service accessible over a network.

14. The system of claim 12, wherein the processor is further configured to access the memory and execute the computer-executable instructions to collectively at least:
request permission from the plurality of sources to access respective electronic content items; and
process communications regarding whether access to the electronic content items has been granted.

15. The system of claim 12, wherein the playlist is created, at least in part, by at least one of the plurality of sources.

16. The system of claim 15, wherein the at least one of the plurality of sources comprises a same source capable of populating the compatible electronic content items.

17. The system of claim 12, wherein the access path for at least one of the plurality of sources comprises a public network.

18. The system of claim 12, wherein the at least one electronic content item of the playlist comprises at least one of an audio file, a video file, an image file, an audiobook file, or a document file.

19. The system of claim 12, wherein:
recommending including the at least one matching electronic content item in the playlist comprises:
providing a palette of recommended electronic content items for inclusion in the playlist for presentation at a user device, the palette of recommended electronic content items including at least a set of matching electronic content items to which the at least one matching electronic content item belongs, the set of matching electronic content items organized in terms of compatibility with respect to the first electronic content item of the playlist; and
receiving a selection of the at least one matching electronic content item from the set of matching electronic content items presented in the palette of recommended electronic content items; and
the processor is further configured to access the memory and execute the computer-executable instructions to collectively at least, in response to receiving the selection, add the at least one matching electronic content item to the playlist.

* * * * *